March 17, 1931.  G. C. BAKEWELL  1,796,278
BEVERAGE MIXER
Filed April 13, 1929   2 Sheets-Sheet 1
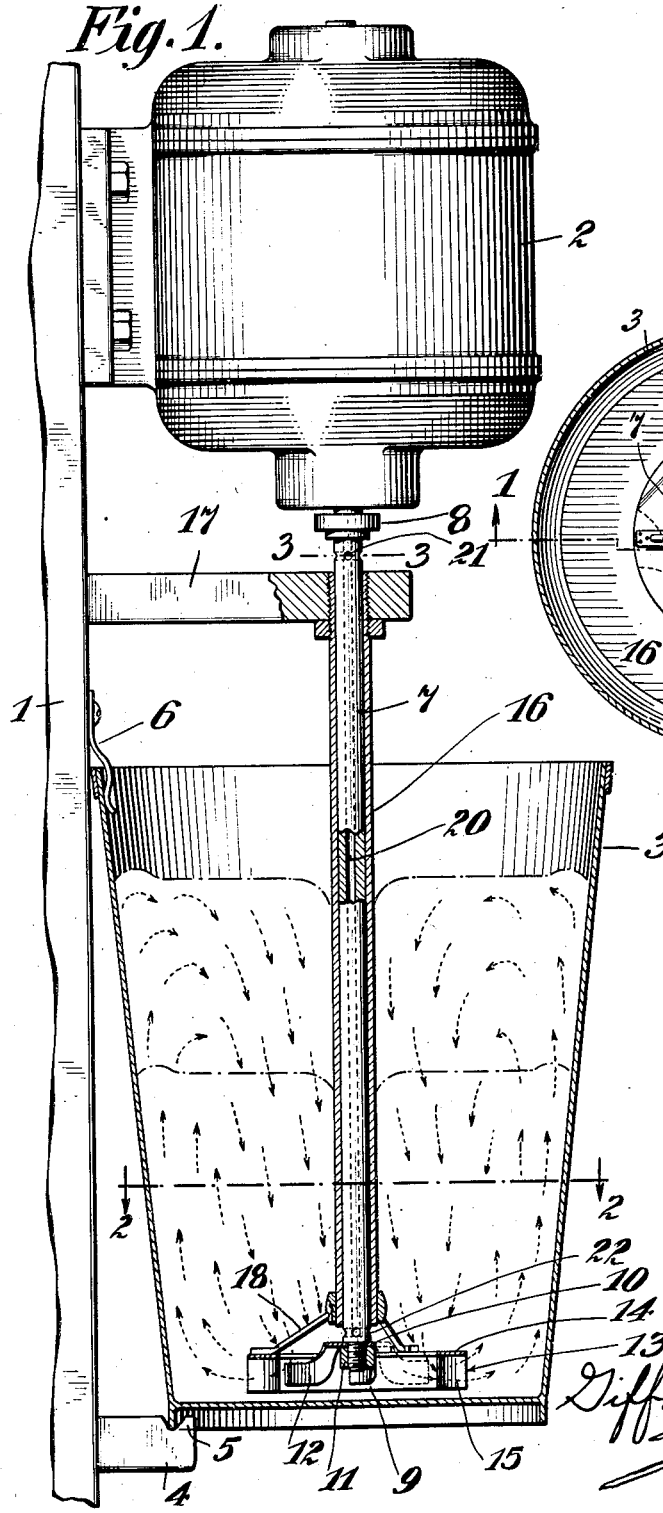
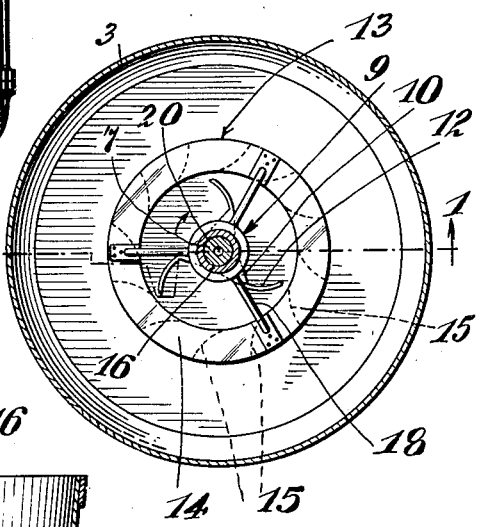
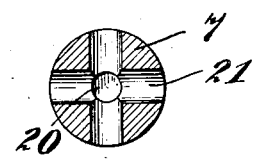

March 17, 1931.   G. C. BAKEWELL   1,796,278
BEVERAGE MIXER
Filed April 13, 1929   2 Sheets-Sheet 2

Patented Mar. 17, 1931

1,796,278

UNITED STATES PATENT OFFICE

GIFFORD C. BAKEWELL, OF NEW YORK, N. Y., ASSIGNOR TO THE TURBO-MIXER CORPORATION, OF NEW YORK, N. Y., A CORPORATION OF NEW YORK

BEVERAGE MIXER

Application filed April 13, 1929. Serial No. 354,767.

My invention relates to mixers of the class designed for mixing or blending liquids in small quantities, and especially for mixing beverages.

The principal object is to provide novel and efficient means for aerating the beverage during mixing. Another object is to provide improved and efficient means for rapidly mixing and blending the ingredients of the "drink", and at the same time aerating it.

To these ends I provide a rotary impeller, usually in cooperation with a stationary deflector, and also provide an air passage through the impeller shaft or a sleeve surrounding the shaft, and terminating in one or more discharge orifices at favorable locations adjacent the impeller or deflector, whereby air is drawn down into the "mix" and thoroughly distributed in small bubbles throughout the liquid.

The characteristics and advantages of the invention are further sufficiently explained in connection with the following detail description of the accompanying drawing, which shows representative embodiments. After considering these examples, skilled persons will understand that many variations may be made without departing from the principles disclosed and I contemplate the employment of any structures that are properly within the scope of the appended claims.

In the drawings:

Fig. 1 is a view, partly in elevation and partly in vertical section, of mixing apparatus embodying the invention in one form.

Fig. 2 is a section at 2—2, Fig. 1.

Fig. 3 is a section at 3—3, Fig. 1.

Figure 4:
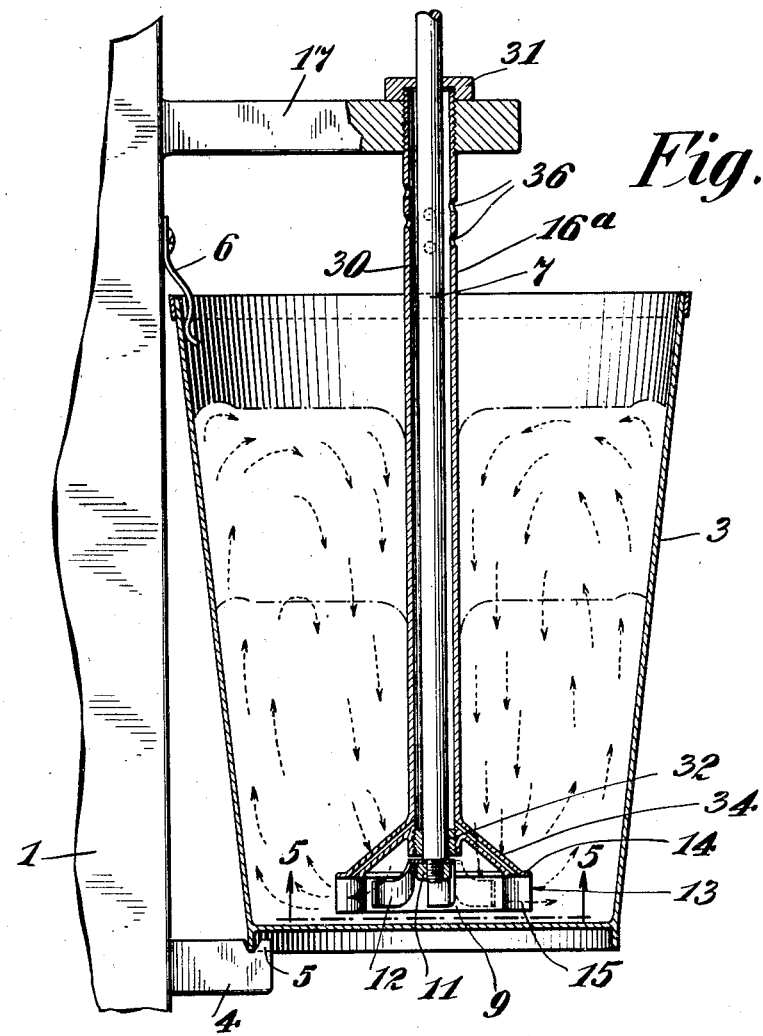
Fig. 4 is a vertical section of a modified structure.

In Figs. 1 to 3, any suitable "stand" or column 1 supports a motor 2, and has means for supporting the mixing cup 3, such as a lug 4 notched at 5 to receive the bottom flange of the cup and a clip 6 in an upward position to engage the upper rim of the cup. By such an arrangement the cup may be inserted without moving the motor and mixing apparatus vertically; otherwise, with other styles of cup supports the motor may be mounted for vertical movement (along with the mixing apparatus proper) upon the upright 1. The motor shaft or a shaft 7 connected to the motor shaft by a flexible coupling 8, extends down through the cup and carries at its lower end a rotary mixer or impeller 9 which in the particular form shown is of modified turbo type, consisting of sheet metal and including a central plate or hub portion 10 connected to the reduced, threaded end of the shaft by nut 11 thereon, and curved and generally tangential blades 12 integral with the plate portion and bent down at right angles thereto. Although the impeller or analogous circulating device may be used without any additional flaw-directing means, I usually prefer to provide a stationary deflector 13, which in the specific form shown is also of sheet metal including an annular or ring portion 14 and blades 15 attached to or integral therewith and bent down at right angles, and curved and arranged as best shown in Fig. 2 to receive liquid discharged tangentially by the impeller and divert it to flow in generally radial planes toward the cup wall and then upward and inward toward the shaft and downward to the impeller, the general circulation being well indicated by arrows in Fig. 1. By this structure or arrangement a vigorous and rapid circulation and thorough mixing are effected in short time and without spilling when the cup is nearly full, because of the absence of swirling or rotary motion of the liquid, which in previous mixing apparatus of this type produces a cupping or cavitation of the liquid surface and over-flowing at the rim of the cup if the liquid is at a high level or if the mixer is run at a desirably high speed.

The deflector is supported and held stationary by a sleeve 16 enclosing the shaft. This sleeve may be secured and supported in an arm 17 extending from upright 1 and may serve as a long bearing for the shaft 7 to hold it in proper alignment and prevent oscillation, as well as supporting the deflector. Spaced arms 18 extend from the lower portion of the shaft to the deflector ring 14.

I also provide aerating means consisting in this embodiment of a central passage 20 through the shaft with one or more intake apertures 21 bored through the shaft at an upper point, usually above sleeve 16 and arm 17, and one or more discharge apertures or ports 22 at a suitable lower location on the shaft, desirably just below the lower end of sleeve 16 and just above the impeller.

In operation, a low pressure zone, or ejector action is produced by the rotation of the impeller and movement of the liquid, this zone including the discharge ports 22, and air is therefore rapidly drawn through ports 21, passage 20 and discharged through ports 22 into the liquid and thoroughly beaten and intermixed therein in small particles or bubbles to properly aerate the beverage, and this effective aeration is accomplished in the brief time required for thorough mixing by the efficient mixing apparatus described.

Figure 5:
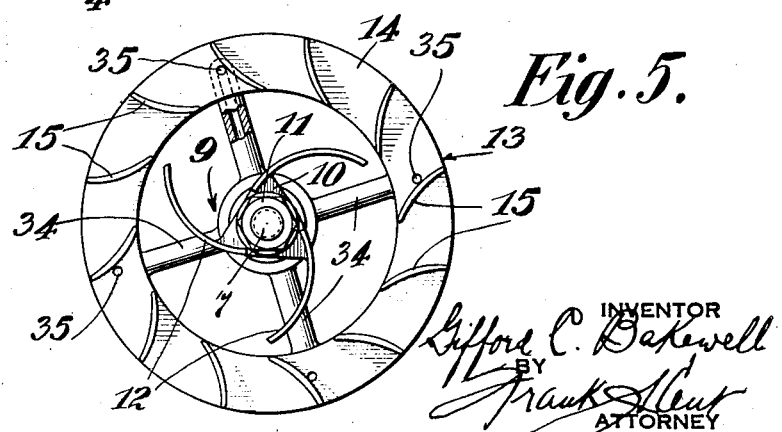
Fig. 5 is a section at 5—5, Fig. 4.

Figs. 4 and 5 show a modification in which sleeve 16ª surrounding the impeller shaft 7, is dimensioned to provide a cylindrical space or passage 30 within the sleeve and about the shaft. The upper end of sleeve 16ª is secured in a supporting arm 17 as in the previous example, and may also have a cap or bushing 31 screwed on the upper end of the sleeve and engaging against the upper face of arm 17 to close the upper end of the sleeve and provide a shaft bearing. The lower end of the sleeve is closed by a bushing 32 screwed into it and providing a lower bearing for the shaft. The impeller and deflector structures may be as previously described, except that arms 34 extending from a lower portion of the sleeve to support the deflector, are made tubular, thus providing for passage of air from the sleeve to discharge ports 35, which are preferably located at rearward (posterior) faces of certain of the deflector blades 15. Air is admitted to an upper portion of the sleeve, above the liquid level of the cup, through any suitable number of ports 36.

In operation, the liquid flow from the impeller through the deflector structure and past the blades produces zones of relatively low pressure at the posterior (convex) faces of the blades, and the discharge ports 35 being located in these zones or low pressure areas, air is vigorously drawn through the sleeve and discharged through the ports into the circulating liquid and thoroughly mixed therein, as previously described.

As a further modification of Fig. 1, the discharge ports 22 may be omitted and the central passage 20 continued to the lower end of the shaft, thus providing a single discharge port at a lower central location (and low-pressure area) of the impeller.

I claim:

1. In mixing apparatus of the class described, in combination with a mixing cup, motor, and shaft connected to the motor, a rotary impeller on the shaft, the shaft being provided with an air passage having an intake at an upward location above the normal liquid level in the cup and a discharge port in a low pressure zone adjacent the impeller, through which air is drawn and intermixed with the circulated liquid, a sleeve connected to an upward support and enclosing the shaft and providing a bearing therefor, and a stationary deflector structure supported by a lower portion of the sleeve and located substantially about the impeller.

2. A mixing and aerating apparatus comprising a revolubly supported shaft, an impeller at one end thereof, a sleeve enclosing the shaft, and a stationary deflector connected to the lower part of the sleeve and surrounding the impeller, the sleeve being spaced from the shaft providing an air passage leading from an upward location to discharge points in low pressure areas of the mixer.

3. A mixing and aerating apparatus comprising a revolubly supported shaft, and an impeller at one end thereof, a sleeve enclosing the shaft, a stationary deflector connected to the lower part of the sleeve and surrounding the impeller, the sleeve being spaced from the shaft to provide an air passage, and tubular arms extending from the sleeve to support the impeller and conduct air from the sleeve to discharge ports located adjacent the posterior face of certain of the deflector blades.

4. Mixing and aerating apparatus comprising a substantially vertical frame; a substantially horizontal supporting arm projecting from said frame; a vertically mounted electric motor positioned above said arm; a depending hollow shaft connected to said motor; an impeller mounted on the lower end of said shaft, said shaft having an axial passageway communicating at its upper end directly with the atmosphere at a point adjacent said arm and communicating at its lower end with a low pressure area set up by said impeller; a bearing sleeve supported by and depending from said arm, said sleeve embracing said shaft and making a running fit therewith; and a removably mounted open top mixing cup surrounding said impeller and at least the lower portion of said shaft.

5. Mixing and aerating apparatus comprising a substantially vertical frame; a substantially horizontal supporting arm projecting from said frame; a vertically mounted electric motor positioned above said arm; a depending hollow shaft connected to said motor; an impeller mounted on the lower end of said shaft, said shaft having an axial passageway communicating at its upper end directly with the atmosphere and communicating at its lower end with a low pressure area set up by said impeller adjacent its center; a bearing sleeve supported by and depending from said arm, said sleeve embracing said shaft and making a running fit therewith; and a removably mounted open top mixing cup surrounding said impeller and at least the lower portion of said shaft.

6. Mixing and aerating apparatus comprising a substantially vertical frame; a substantially horizontal supporting arm projecting from said frame; a vertically mounted electric motor positioned above said arm; a depending hollow shaft connected to said motor; an impeller mounted on the lower end of said shaft, said shaft having an axial passageway communicating at its upper end directly with the atmosphere above said arm and communicating at its lower end with a low pressure area set up by said impeller adjacent its center; a bearing sleeve supported by and depending from said arm, said sleeve embracing said shaft throughout at least a major portion of its length and making a running fit therewith; and a removably mounted open top mixing cup surrounding said impeller and at least the lower portion of said shaft.

7. Mixing and aerating apparatus comprising a support; a sleeve depending from said support; a depending shaft within said sleeve; means to rotate said shaft; an impeller carried by a lower portion of said shaft; and a flow directing stator circumferentially surrounding said impeller and cooperating therewith, said stator being carried by the lower portion of said sleeve; said construction being provided with an air passageway extending longitudinally of said shaft, said passageway communicating at its upper end directly with the atmosphere and communicating at its lower end with a low pressure area set up by the mixing apparatus.

8. Mixing and aerating apparatus comprising a support; a sleeve depending from said support; a depending shaft within said sleeve; means to rotate said shaft; an impeller carried by a lower portion of said shaft; a flow directing stator circumferentially surrounding said impeller and cooperating therewith, said stator being carried by the lower portion of said sleeve; and an open top mixing cup surrounding said impeller and stator; and construction being provided with an air passageway extending longitudinally of said shaft, said passageway communicating at its upper end directly with the atmosphere and communicating at its lower end with a low pressure area set up by the mixing apparatus.

9. Mixing and aerating apparatus comprising a substantially vertical frame; a substantially horizontal supporting arm projecting from said frame; a vertically mounted electric motor positioned above said arm; a depending shaft connected to said motor and passing through said arm; an impeller mounted on the lower end of said shaft; a sleeve supported by and depending from said arm, said sleeve surrounding said shaft; a flow directing stator circumferentially surrounding said impeller and cooperating therewith, said stator being carried by the lower portion of said sleeve; and a removably mounted open top mixing cup surrounding said impeller and stator and at least the lower portions of said shaft and sleeve; said construction being provided with an air passageway extending longitudinally of said shaft, said passageway communicating at its upper end directly with the atmosphere and communicating at its lower end with a low pressure area set up by said mixing apparatus.

In testimony whereof I affix my signature.

GIFFORD C. BAKEWELL.